United States Patent [19]

Sakata et al.

[11] Patent Number: 5,086,261
[45] Date of Patent: Feb. 4, 1992

[54] MOTOR SPEED CONTROL DEVICE FOR USE IN AN IMAGE FORMING APPARATUS

[75] Inventors: Satoshi Sakata; Kazuo Sato; Yuichi Gotoh; Mitsuo Azumai; Ikuya Hotta, all of Hachioji, Japan

[73] Assignee: Konica Corporation, Tokyo, Japan

[21] Appl. No.: 606,627

[22] Filed: Oct. 31, 1990

[30] Foreign Application Priority Data

Oct. 31, 1989 [JP] Japan .................. 1-283822
Dec. 26, 1989 [JP] Japan .................. 1-335105

[51] Int. Cl.$^5$ ........................... H02P 1/00
[52] U.S. Cl. ................... 318/268; 388/811; 388/911
[58] Field of Search ............. 318/268, 66, 68, 69, 318/73, 85, 599, 606-609, 628; 388/809, 811-815, 819-823, 911, 912

[56] References Cited

U.S. PATENT DOCUMENTS

| Re. 33,500 | 12/1990 | Bisseling | 388/912 X |
| 4,240,014 | 12/1980 | Muller | 388/811 |
| 4,278,925 | 7/1981 | Minakuchi | 388/813 |
| 4,348,625 | 9/1982 | Sharp | 318/800 |
| 4,964,117 | 10/1990 | Shier | 375/108 |

FOREIGN PATENT DOCUMENTS 58-76909 5/1983 Japan .

Primary Examiner—William M. Shoop, Jr.
Assistant Examiner—A. Jonathan Wysocki
Attorney, Agent, or Firm—Finnegan, Henderson, Farabow, Garrett, and Dunner

[57] ABSTRACT

A motor speed control device for use in an image forming apparatus with a differential phase detection circuit for outputting differential phase data between the clock pulse and a frequency proportional signal representative of the motor speed and a differential speed detecting circuit for outputting differential speed data between the length of the clock signal and the length of the speed signal. A pulse width modulated signal obtained from the two signals controls the speed of the motor.

4 Claims, 16 Drawing Sheets

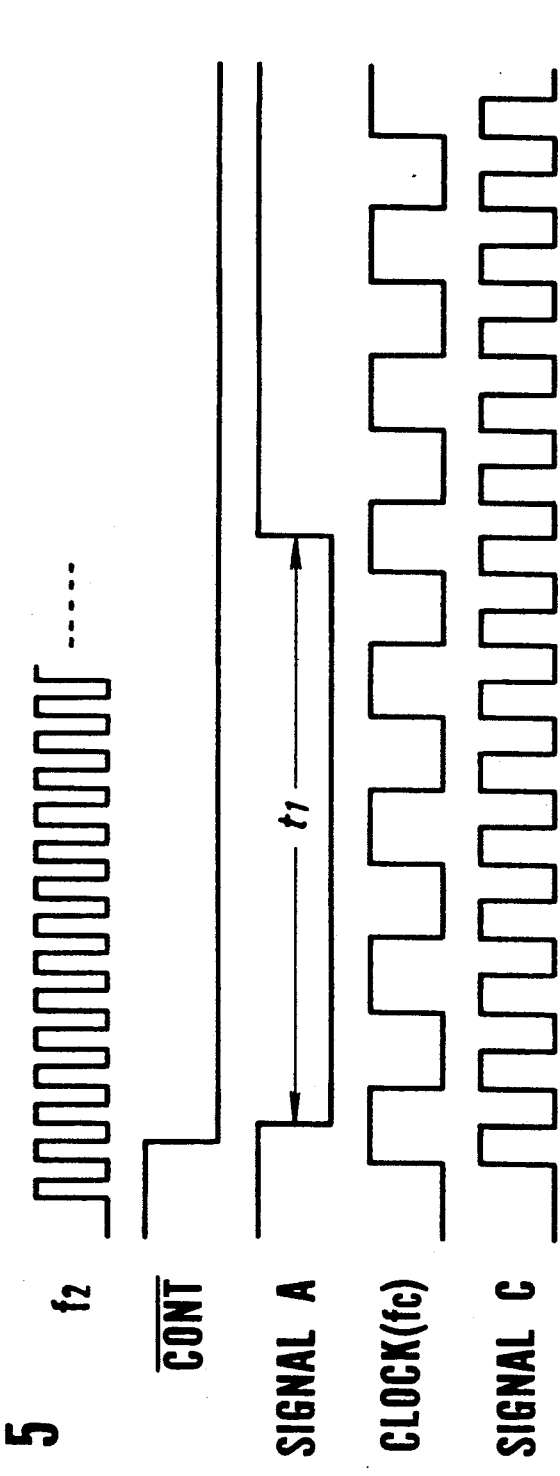
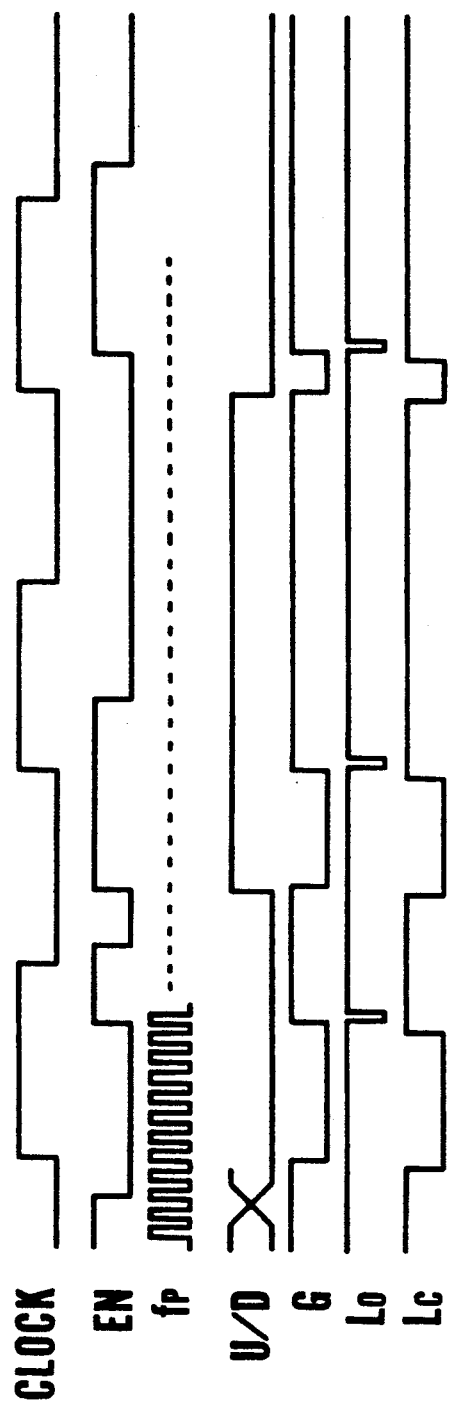

MOTOR SPEED CONTROL DEVICE FOR USE IN AN IMAGE FORMING APPARATUS

BACKGROUND OF THE INVENTION

1. Field of the Invention

The present invention relates to a motor speed control device for use in an image forming apparatus like an electrophotographic copying apparatus or a laser printer for example.

2. Description of the Prior Art

Taking an electrophotographic copying apparatus by way of a typical example of conventional image forming apparatus, an analogue-format proportional intergration control device, a digital servo system introducing software as described in the Japanese Laid-Open Patent Publication No. 58-76909 of 1983, or an analogue PLL system is made available for controlling the speed of DC motors designed to drive a light-exposure optical system for an original to be copied, a photosensitive drum, and fixing rollers.

On the other hand, there is a tendency that some of electrophotographic copying apparatuses available today incorporates multiple functions including zooming function, double-face copying function, masking function, trimming function, automatic selection of copying paper, detection and designation of jammed paper position, or the like. In consequence, conventional motor speed control device unavoidably involves complexity.

FIG. 1 shows an example of the structure of the analogue PLL control circuit as one of the conventional motor speed control systems for an image forming apparatus.

This conventional analogue PLL control circuit is composed of the following; a speed feedback circuit 200 which compares an encoder signal with a speed instruction signal delivered from an external source, and then amplifies the difference, where the encoder signal is generated by an encoder 101 which detects the number of rotation of the DC motors built in the image forming apparatus; a phase feedback circuit 201 which calculates the differential phase and amplifies this data signal by comparing the reference clock pulse with the encoder signal a gain setting circuit 202 which adds up the differential speed signal and the differential phase signal before controlling current flowing into the DC motors; a regulator 203; and a current amplifier 204.

As is clear from FIG. 1, each of these circuits mentioned above incorporates an operational amplifier and a number of resistors and capacitors. These circuit elements are easily subject to adverse influence of external interference caused by varied ambient temperature and humidity, varied power voltage, or noise, for example. Furthermore, in order to compensate for uneven performance characteristic of sensors and those circuit elements, extremely fine adjustment must be executed by the regulator 203 while the assembly process is under way. This is turn incurs much inconvenience to all the concerned. And yet, there is a certain limit in consummating the fine adjustment. Furthermore, provision of a large number of circuit components obliges the manufacturer to incur the increased cost. In addition, provision of substantial inner space for these components results in the expanded dimension of the system, and yet, lowers reliability.

To solve those problems mentioned above, a digital servo control system introducing software and being free from external interference was previously proposed by the Japanese Laid-Open Patent Publication No. 58-76909 of 1983 as cited earlier. An example of this digital servo control system is shown in FIG. 2. This system introduces a central processing unit CPU 300, a read-only memory ROM 301, and a random access memory RAM 302. Based on an encoder signal designating the number of the rotation of a DC motor 100 detected by an encoder 101, the CPU 300 outputs a motor speed control signal for delivery to a PWM converter 303, which then converts this control signal into a pulse-width modulated signal. The pulse-width modulated signal is then amplified by an amplifier 304 before the amplified signal starts to control the speed of the rotation of a DC motor 100.

On the other hand, since the above digital servo control system needs to operate a CPU, when providing solely usable CPUs for all the built-in DC motors, it in turn results in the increased cost. To solve this problem, a single CPU which is normally used for the sequence control is made available for concurrently controlling the speed of the rotation of each DC motor built in the image forming apparatus. This effectively saves cost. On the other hand, since the operational sequence of any electrophotographic copying apparatus must be controlled with an extremely fast speed, part of the sequential control processes must be deleted, or alternatively, the copying apparatus is obliged to sacrifice the motor control performance characteristic, thus raising another critical problem.

SUMMARY OF THE INVENTION

The primary object of the invention is to provide a novel motor speed control device which is capable of properly executing phase-locked-loop format speed control operation throughout an extensive range without incurring external interference by providing a digital control circuit dispensing with the CPU.

The second object of the invention is to provide a novel motor speed control device which is capable of precisely detecting differential speed without incurring external interference like noise by providing a simple circuit structure.

The third object of the invention is to provide a novel motor speed control device which is capable of securely executing the digital PLL speed control operation even at the moment immediately after activating the rotation of motors.

To achieve the primary object of the invention, according to an embodiment of the invention, a novel motor speed control device is hereby provided, which features those sequential speed control operations described below.

First, the motor speed control device generates a bias data based on clock pulses containing specific frequencies corresponding to the predetermined degrees of the speed of the rotation of the built-in DC motors.

Next, a differential phase signal is output after biasing the first control value by applying the above bias data, wherein the first control value is generated by causing the first reference clock pulse (containing a specific frequency higher than that of the clock pulse signal) to count the difference of phases between the clock pulse signal and the motor-rotating pulse signal containing a frequency proportional to the actual speed of the rotation of the DC motors.

Next, the length of one-cycle of the clock pulse signal and the length of one-cycle of the motor-rotating pulse signal are respectively counted by means of the second reference clock pulse signal containing a specific frequency higher than that of the clock pulse signal before eventually computing the second and third counted values.

Next, a differential speed data is output by digitally computing the second and third counted values;

Next, the differential phase data and the differential speed data are digitally computed.

Next, a pulse signal having the width modulated by the counting of the digitally computed differential data is output.

Finally, the output pulse-width-modulated signal properly controls the speed of the rotation of the DC motors To achieve the second object of the invention, according to an embodiment of the invention, a novel motor speed control device is hereby provided, which incorporates a circuit for detecting the differential speed data, wherein, on receipt of a motor-rotating instruction signal, the differential speed detecting circuit latches the value of the counted second reference clock pulse during one-cycle of the clock pulse signal so that the latched value can be utilized as the second counted reference value while the DC motor keeps on rotating itself.

To achieve the third object of the invention, according to an embodiment of the invention, a novel motor speed control device is hereby provided, wherein the built-in differential speed detecting circuit compulsorily activates the rotation of the DC motor on receipt of the motor-rotating instruction signal, and then, as soon as the predetermined number of the motor-rotating pulse signal is counted up, the differential speed detecting circuit releases the motor from the state of compulsory rotation.

The above and further objects as well as the structure of the motor speed control device embodied by the invention will more fully be understood from the following detailed description in association with the accompanying drawings.

BRIEF DESCRIPTION OF ACCOMPANYING DRAWINGS

FIGS. 1 and 2 respectively shows different examples of conventional motor speed control circuits;

FIG. 5 shows the timing chart of signals present in the bias-data generating circuit shown in FIG. 4;

FIG. 7 shows the timing chart of signals present in the differential phase detecting .circuit shown in FIG. 6;

Figure 3:
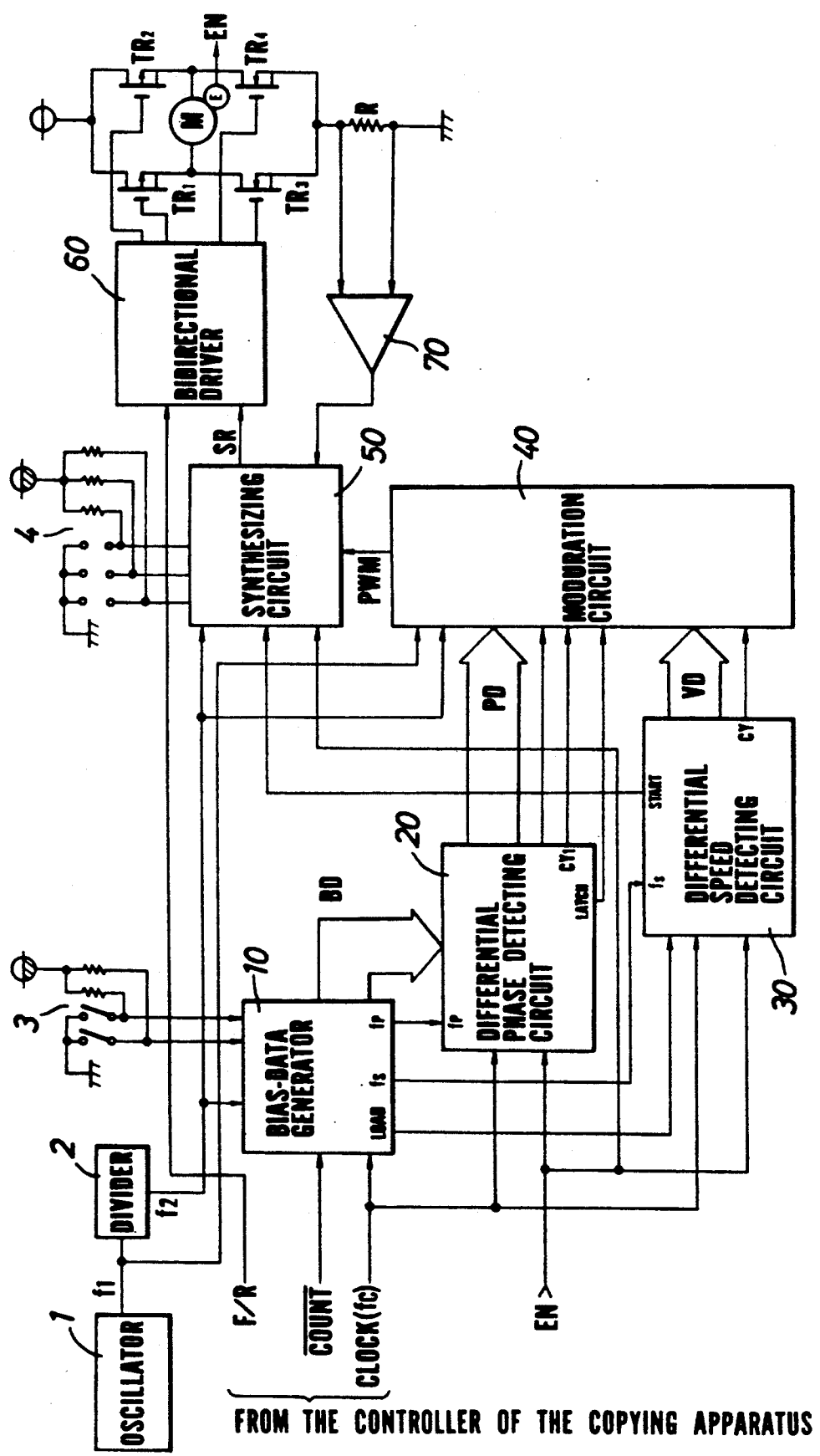
FIG. 3 shows overall schematic block diagram of the motor speed control device according to an embodiment of the invention.
Figure 10:
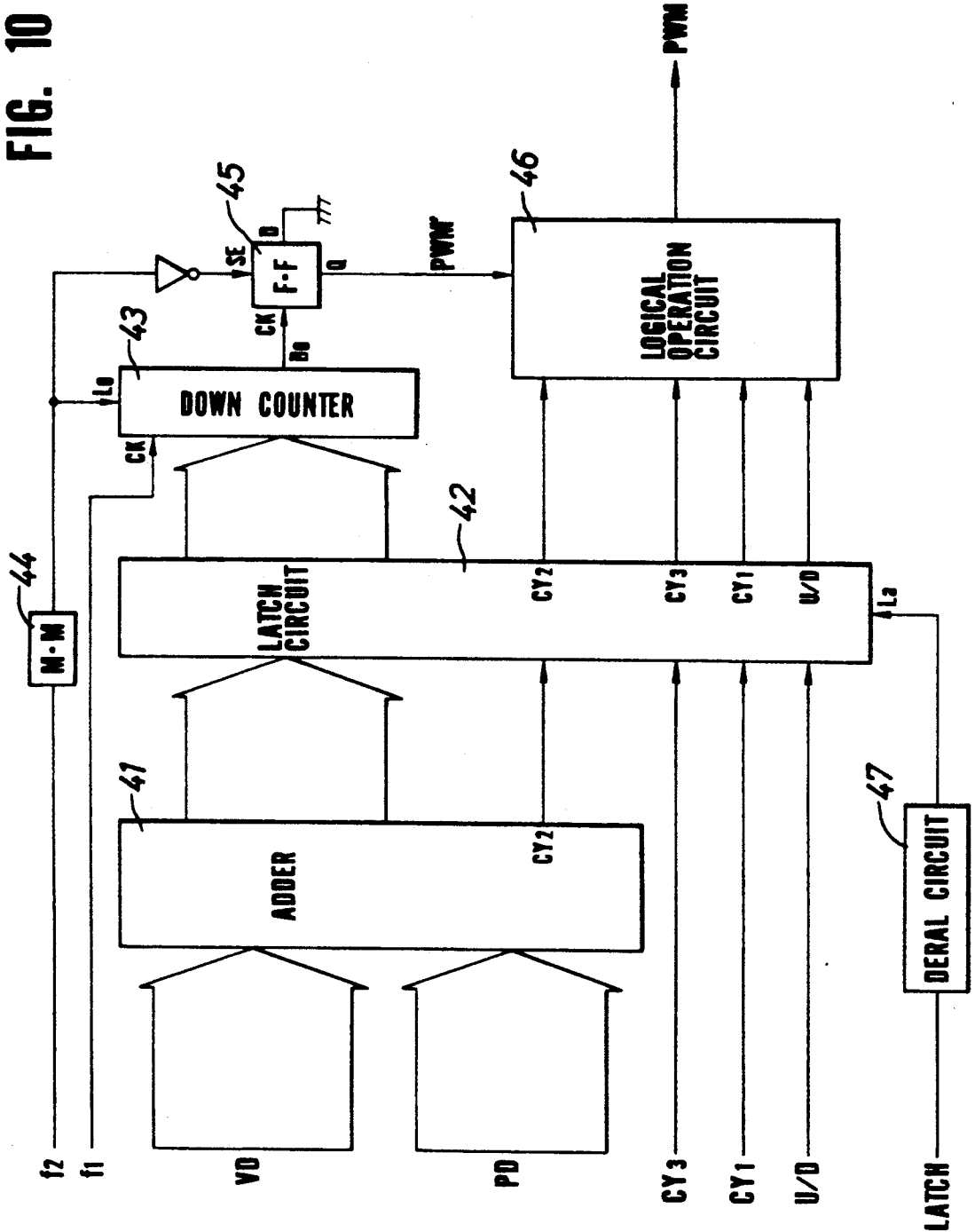
FIG. 10 shows an example of the block diagram of the modulation circuit shown in FIG. 1.
Figure 11:
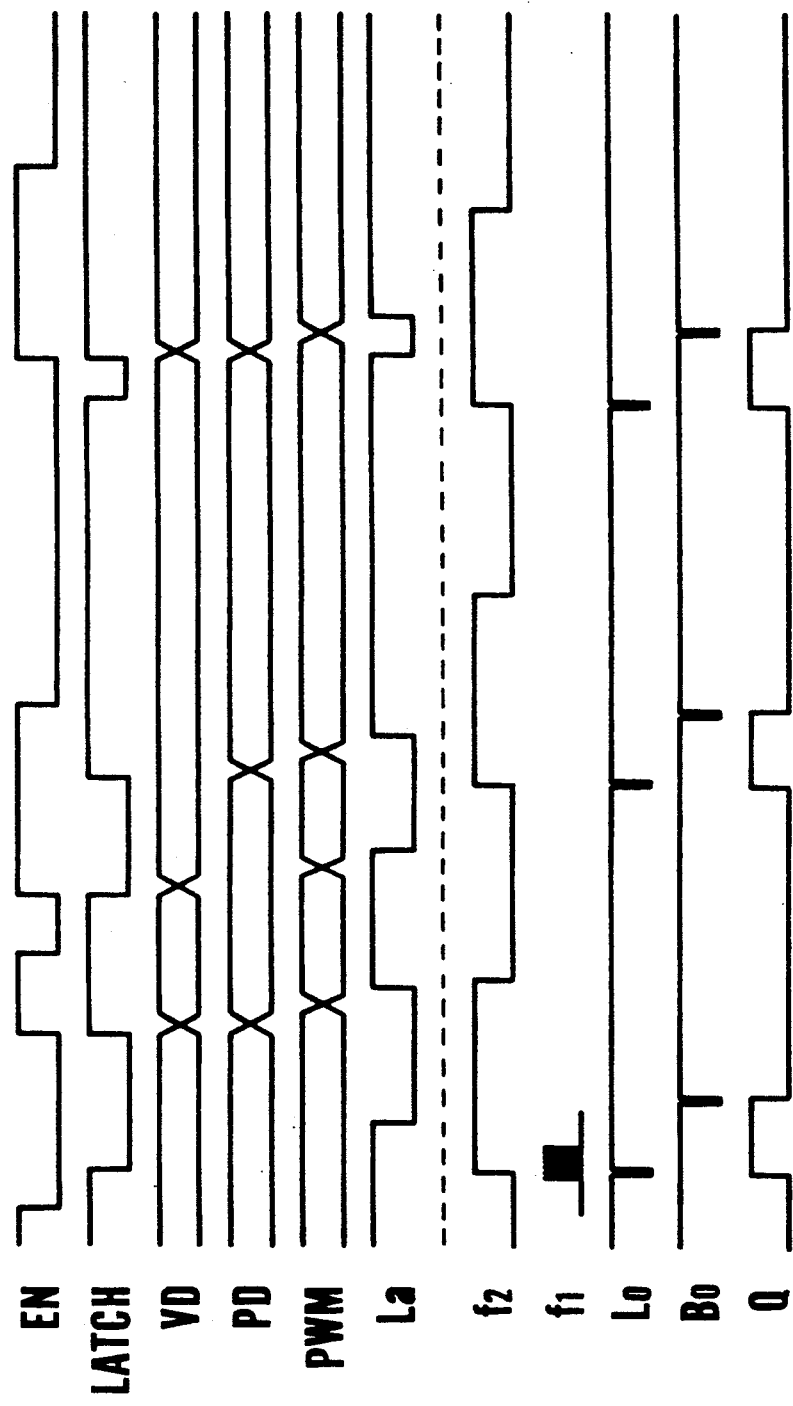
Figure 12:
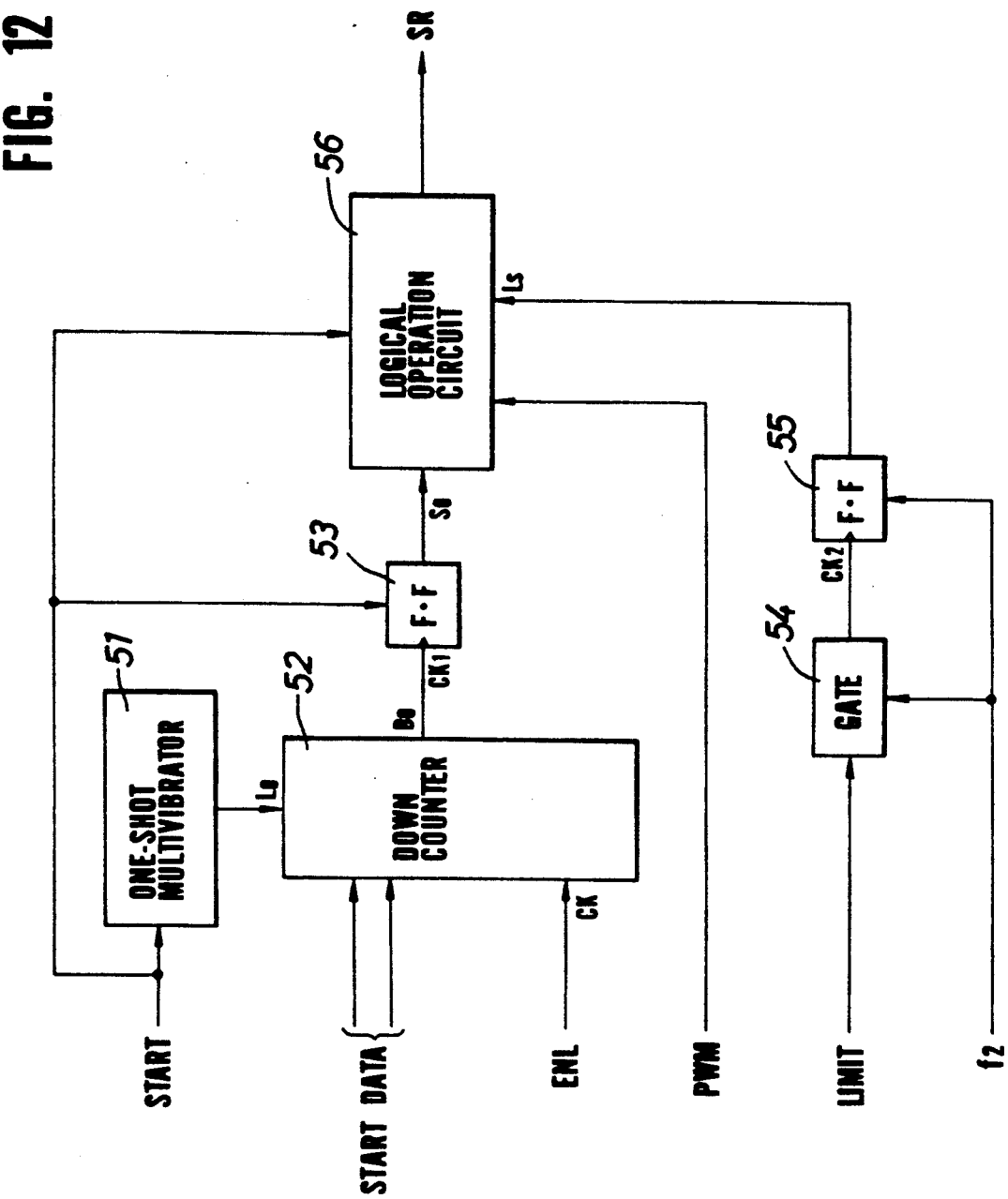
Figure 13:
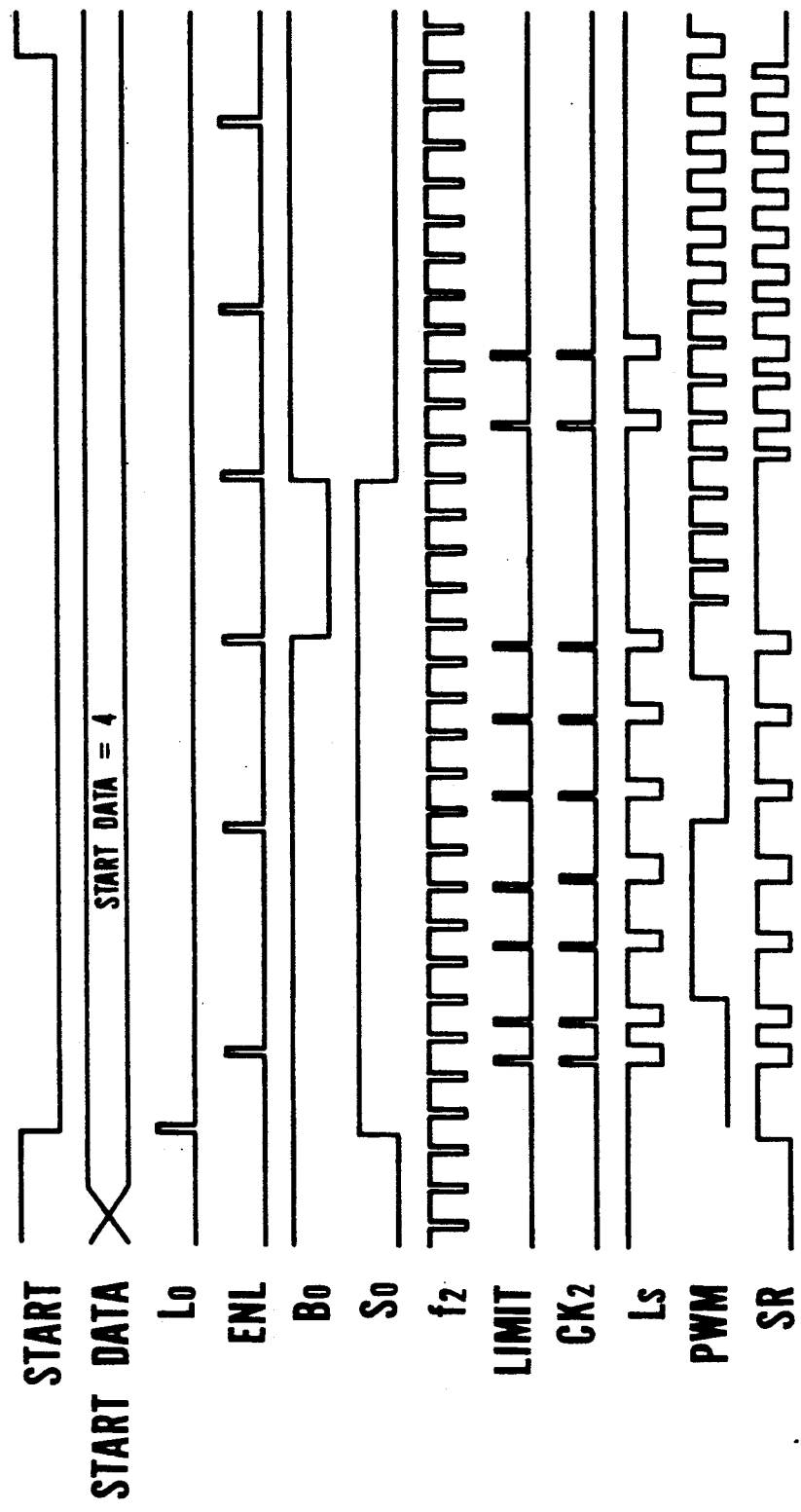
Figure 14:
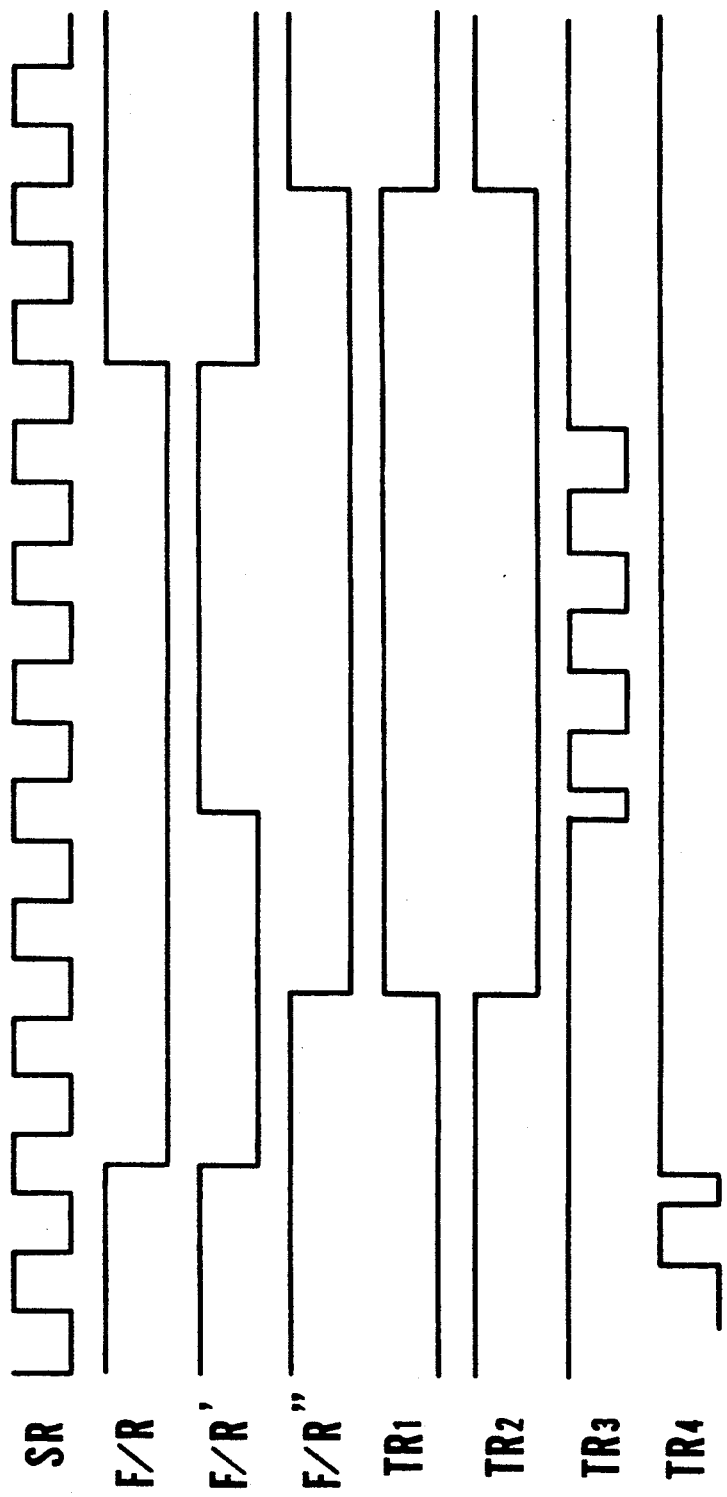
Figure 15:
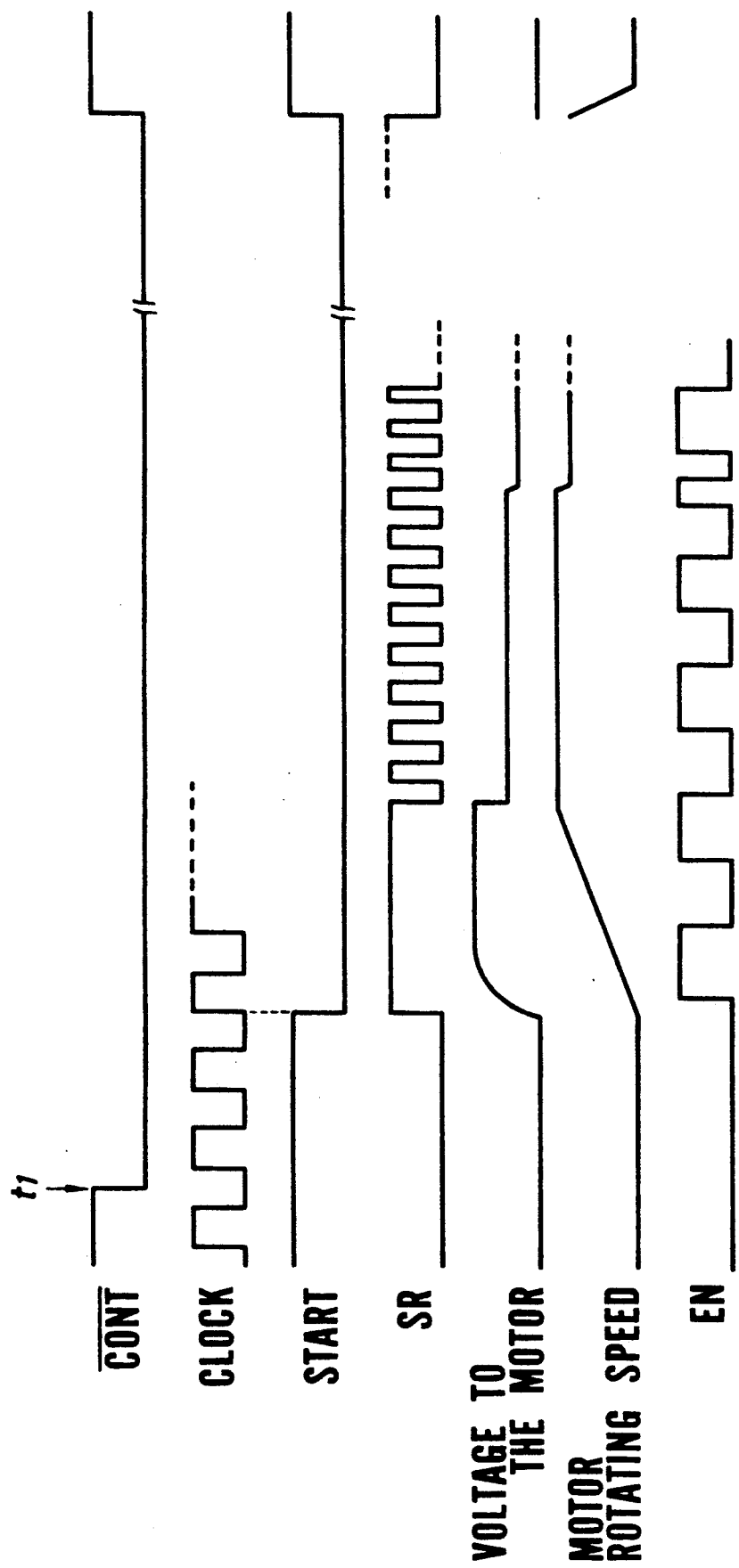
Figure 16:
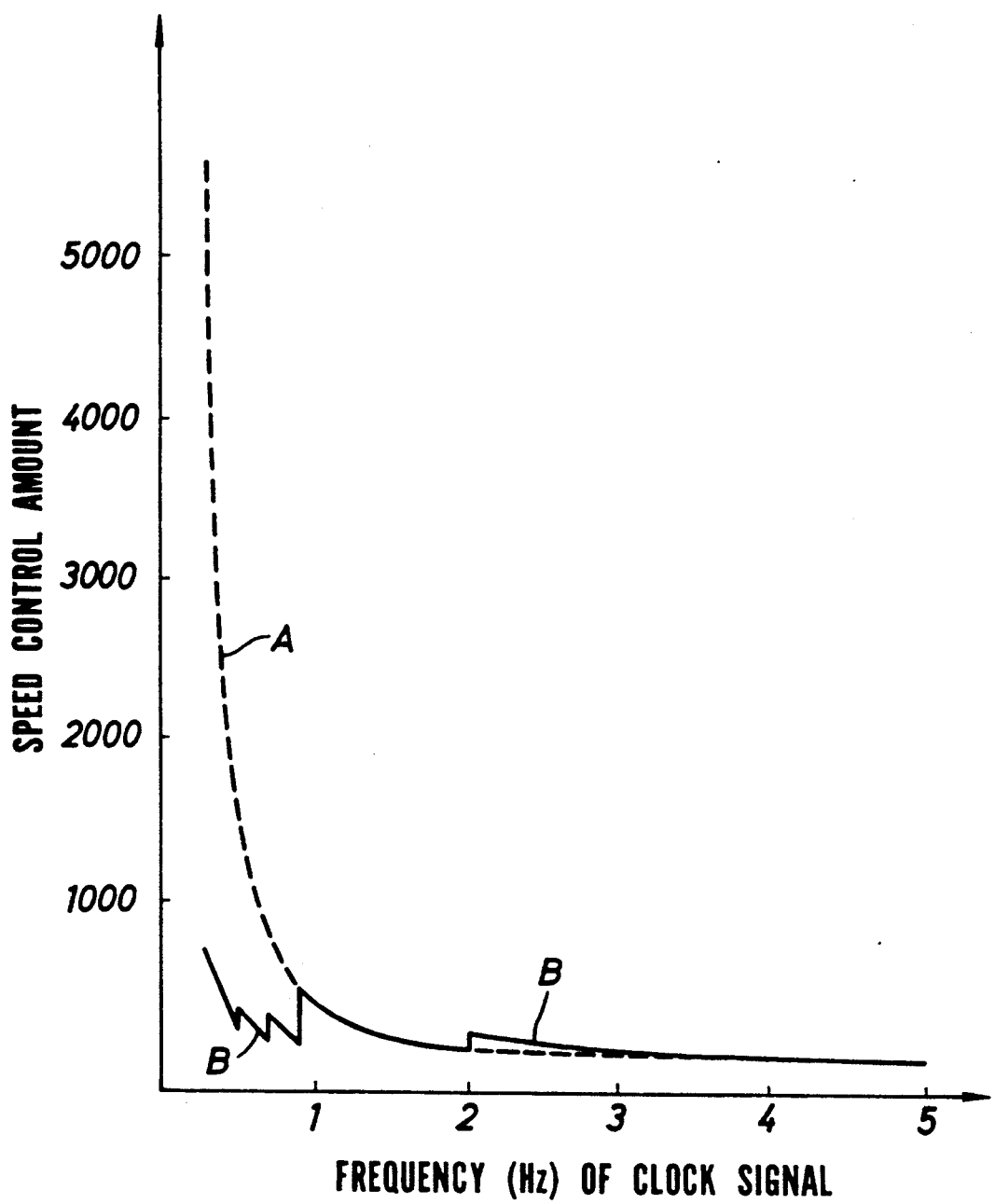
Figure 17:
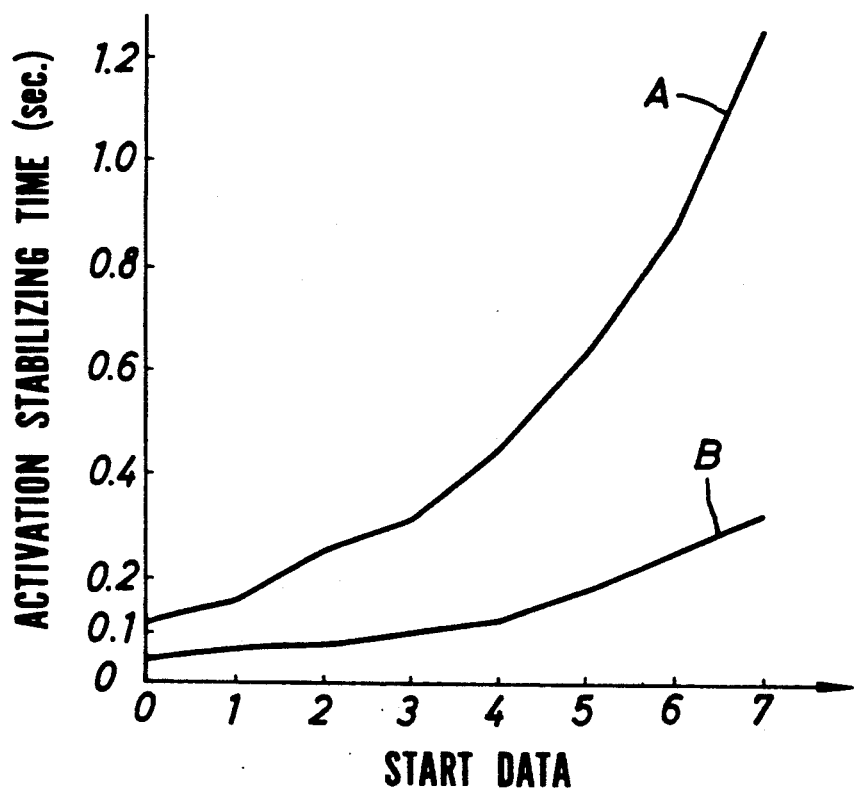

FIG. 11 designates the timing chart of signals present in the modulation circuit shown in FIG. 10;

FIG. 12 shows an example of the block diagram of the synthesizing circuit shown in FIG. 3;

FIG. 13 shows the timing chart of signals present in the synthesizing circuit shown in FIG. 12;

FIG. 14 shows the timing chart of signals output from the bidirectional driver shown in FIG. 3;

FIG. 15 shows the timing chart of signals for explaining the functional operation of the motor speed control device according to an embodiment of the invention;

FIG. 16 shows a chart showing variation of the amount of speed control against frequencies corresponding to the speed activated for rotating the motor; and FIG. 17 shows a chart showing variation of time needed for stabilizing the rotation of the activated motor against the startup data.

DESCRIPTION OF THE PREFERRED EMBODIMENTS

Referring now more particularly to accompanying drawings, details of the motor speed control device according to the invention are described below.

FIG. 3 shows the overall schematic block diagram of the motor speed control device embodied by the invention. The description typically refers to the DC motors which are conventionally used for operating an electrophotographic copying apparatus for example.

The reference numeral 10 shown in FIG. 3 shows a bias-data generating circuit which, on receipt of a motor-rotation startup/stop instruction signal CONT from the controller unit (not shown) of the electrophotographic copying apparatus simultaneous with the activation of the copying operation, generates reference clock signals containing frequencies fs and fp, a bias data BD, and a loading signal LOAD, by applying a specific signal containing frequency $f_2$ delivered from a divider 2.

The reference numeral 20 designates a differential phase detecting circuit, which initially measures the phases of a clock signal CLOCK containing frequency fc and an encoding signal EN containing a specific frequency proportional to the number of the rotation of the DC motor, where both the clock signal CLOCK and the encoding signal EN are delivered from the controller unit (not shown) of the copying apparatus. The differential phase detecting circuit 20 then generates a differential phase data PD by adding the reference clock signal containing frequency fp and the bias data BD to the measured differential phase.

The reference numeral 30 designates a differential speed detecting circuit, which initially converts the clock signal containing frequency fc into a 12-bit data by applying the load signal LOAD delivered from the bias data generating circuit 10, and then latches the converted 12-bit data, and at the same time, it also converts the encoding signal EN into a 12-bit data. Finally, the differential speed detecting circuit 30 outputs the differential speed data VD which designates the difference between the 12-bit clock data and the 12-bit encoding data.

The reference numeral 40 designates a modulation circuit which generates a pulse-width modulation signal by applying the differential phase data PD delivered from the differential phase detecting circuit 20 and the differential speed data VD delivered from the differential speed detecting circuit 30.

The reference numeral 50 designates a synthesizing circuit which synthesizes a speed control signal by applying the pulse-width modulation signal PWM and a startup signal START.

The reference numeral 60 designates a bidirectional driver which generates a rotation signal for a DC motor 100 based on a motor forward and backward rotation signal F/R which is output from the controller unit (not shown) of the copying apparatus and the speed control signal SR output from the synthesizing circuit 50.

The reference numeral 70 designates an amplifier which detects current flowing into the DC motor 100 as a voltage applicable to both terminals of a resistor R and then amplifies it.

The speed control device embodied by the invention switches the rotation f the DC motor 100 between the clockwise and counterclockwise directions by switching transistors $TR_1$ through $TR_4$ by applying the rotation signal generated by the bidirectional driver 60.

A rotary encoder 101 detects the speed of the rotation of the DC motor 100 and then outputs the encoding signal EN containing a specific frequency proportional to the number of the rotation of the DC motor 100.

The reference numeral 2 designates a divider which divides a signal containing frequency $f_1$ oscillated by an oscillator 1 into frequency $f_2$. The reference numeral 3 designates a bias adjuster which finely adjusts the speed control points for respective motors. The reference numeral 4 designates a startup data setter which adjusts startup characteristic according to the kinds of motor and the kinds of load driven by these motors.

Figure 4:
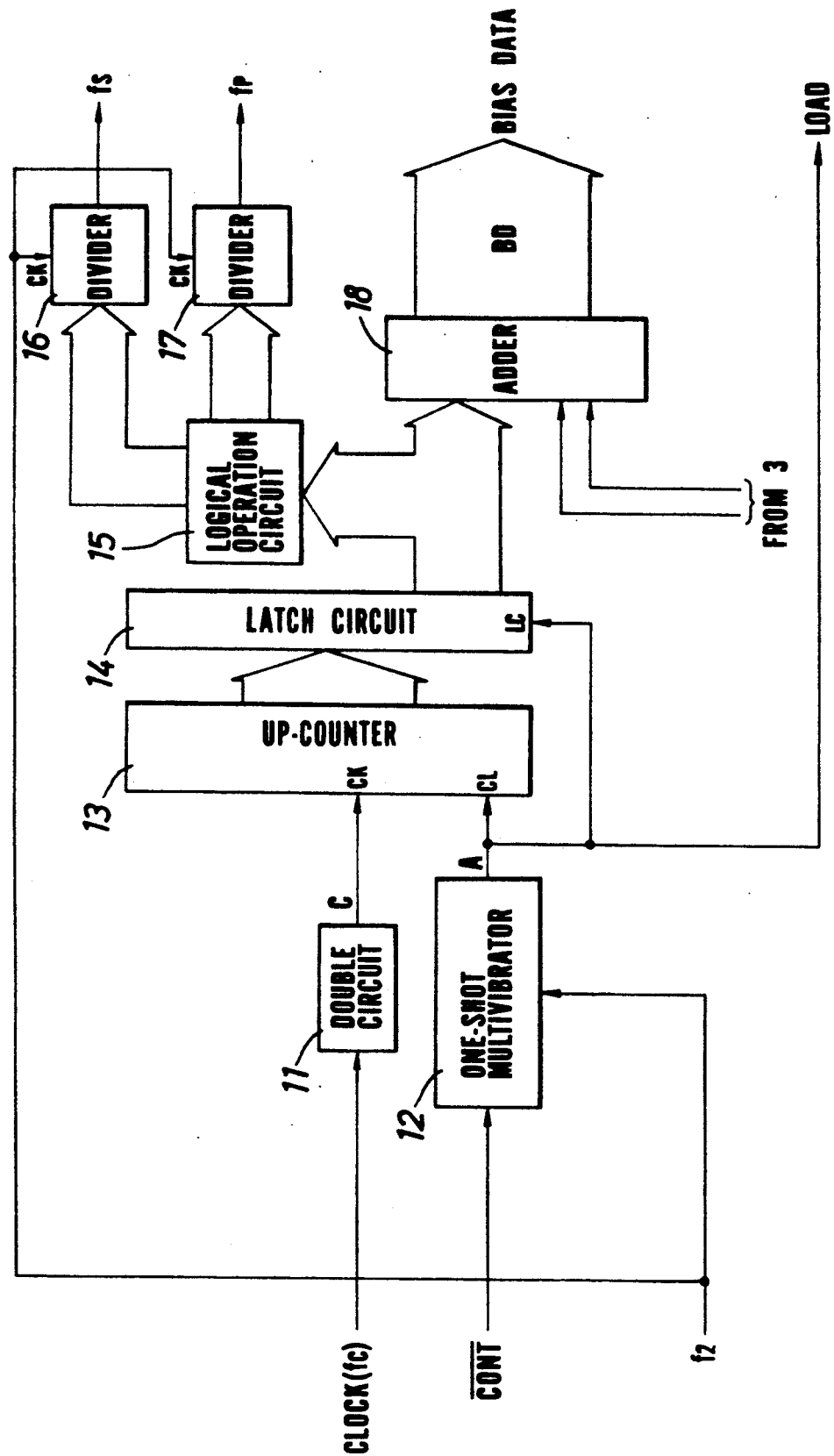
FIG. 4 shows an example of the block diagram of the bias-data generating circuit shown in FIG. 1.

Next, structure of the main circuit blocks shown in FIG. 3 is described below. FIG. 4 shows an example of the structure of the bias data generating circuit 10. FIG. 5 shows the timing chart of signals present in the bias data generating circuit 10.

The reference numeral 11 designates a doubling circuit which doubles the frequency fc of the clock pulse signal CLOCK and then converts the doubled frequency into a signal C. The reference numeral 12 designates a one-shot multivibrator which outputs a signal A of "LOW" level for a duration "$t_1$" after being triggered by the falling edge of the motor rotation startup/stop instruction signal CONT. The reference numeral 13 designates an up-counter which keeps on counting the signal C while while the signal A remains in "LOW" level during the period "$t_1$". The reference numeral 14 designates a latch circuit which latches the upper 5-bit data of the 7-bit values counted by the up-counter 13 by applying the signal A.

The reference numeral 15 designates a logical operation circuit which generates 6-bit and 8-bit signals from the 5-bit data output from the latch circuit 14. The reference numeral 16 designates a divider which counts down the 6-bit signal based on the signal counting frequency $f_2$ and then outputs a reference clock signal containing frequency fs. The reference numeral 17 designates a divider which counts down the 8-bit signal based on the signal containing frequency $f_2$ and then outputs a reference clock signal containing frequency fp. The reference numeral 18 designates an adder which adds the 5-bit data output from the latch circuit 14 to the bias-adjusting data set by the bias-adjuster 3 available for finely adjusting the speed control point variable according to motors, and then the adder 18 outputs the resultant bias data BD.

Figure 6:
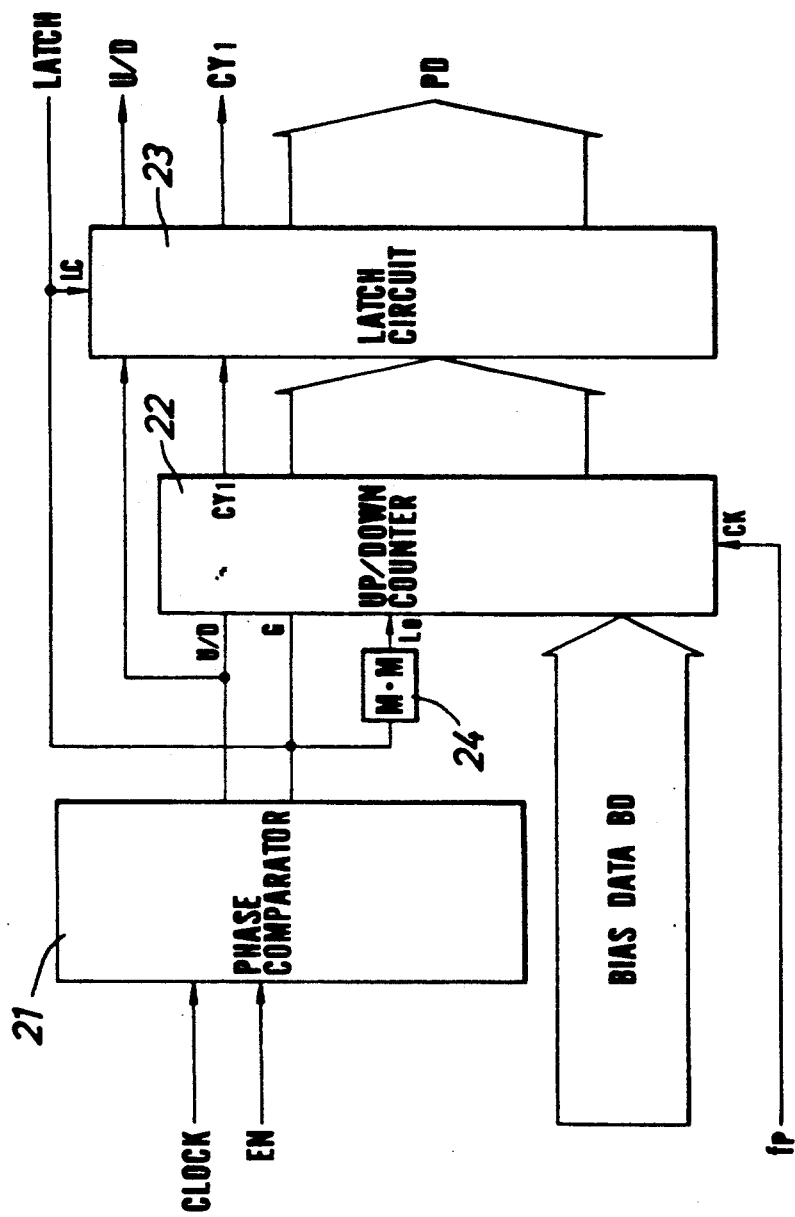
FIG. 6 shows an example of the block diagram of the differential phase detecting circuit shown in FIG. 3.

FIG. 6 shows an example of the structure of the differential phase detecting circuit 20. FIG. 7 shows the timing chart of signals present in the differential phase detecting circuit 20.

The reference numeral 21 designates a phase comparator which compares the clock signal CLOCK to the encoding signal EN and then outputs a differential phase signal G designating the difference of the phases of these signals CLOCK and EN, and also outputs an advanced/delay signal U/D designating either the advance or the delay of the phases.

The reference numeral 22 designates an up-and-down counter which counts up or counts down the reference clock signal fp against the bias data BD while the differential phase signal G output from the phase comparator 21 remains "LOW".

The reference numeral 23 designates a latch circuit which latches a 10-bit differential phase data and a differential phase carrier signal $CY_1$ output from the up-and-down counter 22 by applying the differential phase signal G output from the phase comparator 21.

The reference numeral 24 designates a one-shot multivibrator which generates a load signal $L_0$ at the rising edge of the differential phase signal G. The up-and-down counter 22 loads the bias data BD by applying the load signal $L_0$.

Figure 8:
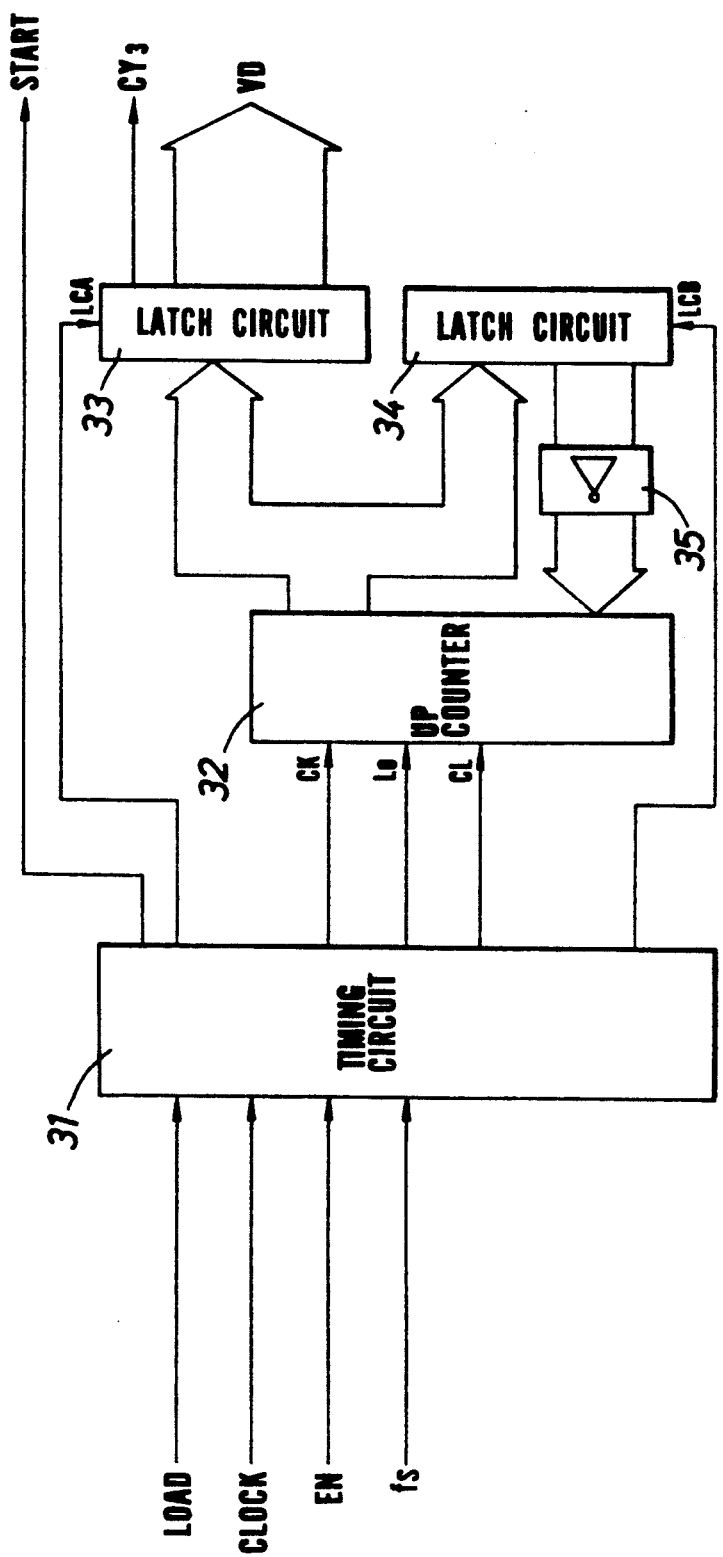
FIG. 8 shows an example of the block diagram of the differential speed detecting circuit shown in FIG. 3.
Figure 9:
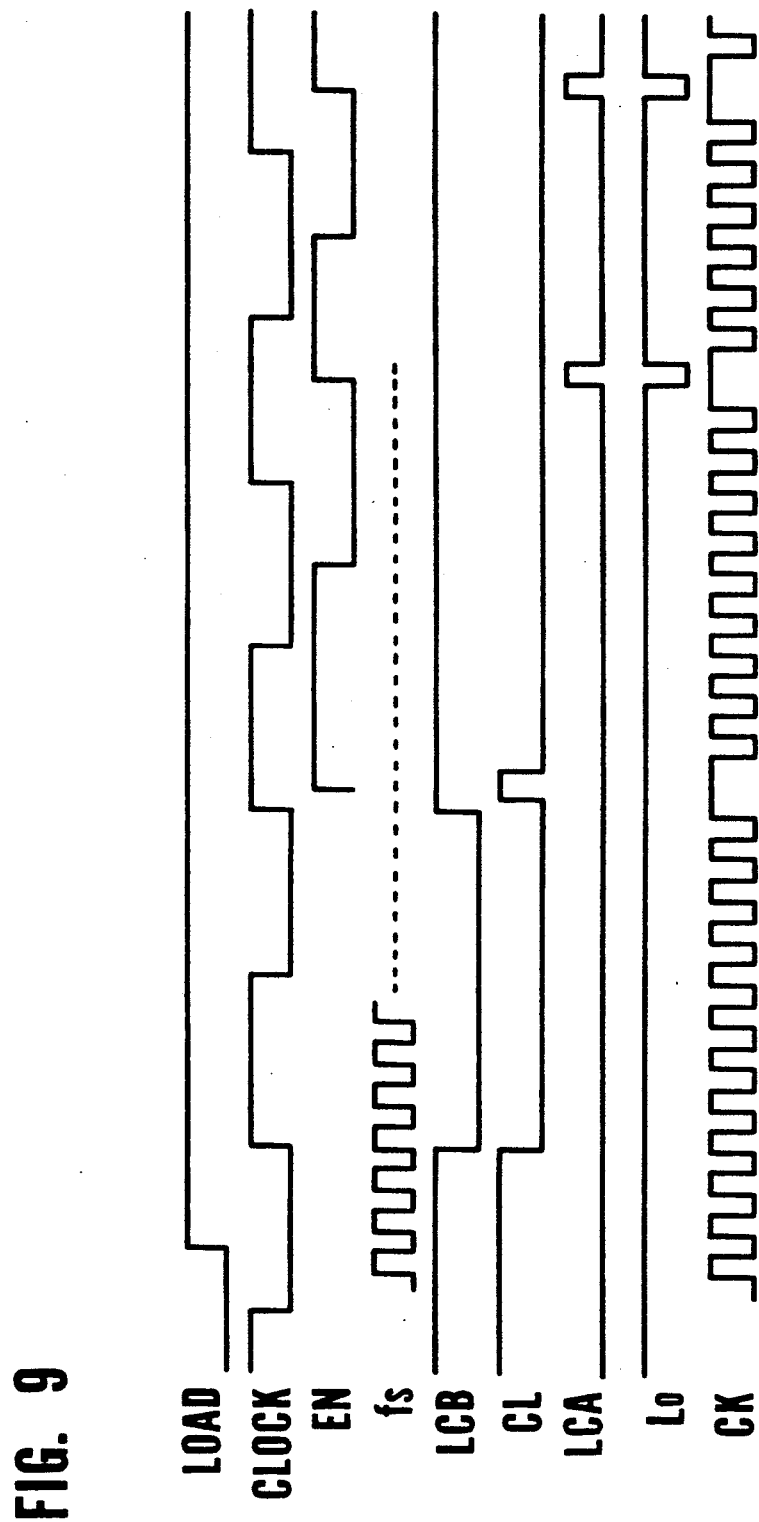
FIG. 9 shows the timing chart of signals present in the differential speed detecting circuit shown in FIG. 8.

FIG. 8 shows an example of the structure of the differential speed detecting circuit 30. FIG. 9 shows the timing chart of signals present in the differential speed detecting circuit 30.

The reference numeral 31 designates a timing circuit which receives the load signal LOAD, the clock signal CLOCK, the encoding signal EN, and the reference clock signal containing frequency fs, and outputs the load signal LOAD shown in FIG. 7, latch signals LCA and LCB, a clock signal CK which is equivalent to the reference clock signal containing frequency fs, the load signal $L_0$, and a clearing signal CL. The reference numeral 32 designates an up-counter which counts up the clock signal CK while the clearing signal remains "LOW". The reference numeral 33 designates a latch circuit which latches the counted signal output from the up-counter 32 by applying the latch signal LCA. The reference numeral 34 designates a latch circuit which also latches the counted signal output from the up-counter 32 by applying the latch signal LCB. The reference numeral 35 designates an inverter which inverts the signal output from the latch circuit 34.

FIG. 10 shows an example of the structure of the modulation circuit 40. FIG. 11 shows the timing chart of the signals in the modulation circuit 40.

The reference numeral 41 designates an adder which adds up the differential speed data VD and the differential phase data PD. The reference numeral 42 designates a latch circuit which latches the added data delivered from the added 41 by applying a latch signal La, and then latches an operation carrier signal $CY_2$, a differential speed carrier signal $CY_3$, a differential phase carrier signal $CY_4$, and the advance/delay signal U/D, before delivering these signals to a down counter 43. The reference numeral 43 designates a down counter which initially loads those data delivered from the latch circuit 42 by applying the load signal $L_0$ generated by a one-shot multivibrator 44 at the rising edge of the signal containing frequency $f_2$, and then counts down the loaded signal by applying the signal containing frequency $f_1$.

The reference numeral 45 designates a flip-flop which an output signal Q to "HIGH" level by applying the signal that has inverted the signal output from the one-shot multivibrator 44, and then turns the output signal Q to "LOW" level by applying a borrow signal $B_0$ output at the moment when the down-counter 43 terminates the counting operation.

The reference numeral 46 designates a logical operation circuit which outputs a pulse-width modulation signal PWM as per the logic table to be described later on by applying those carrier signals $CY_1$, $CY_2$, $CY_3$, and the advance/delay signal U/D output from the latch circuit 42.

The reference numeral 47 designates a delay circuit which generates the latch signal La by delaying a latch signal LATCH output from the differential phase detecting circuit 20.

FIG. 12 shows an example of the structure of a synthesizing circuit 50. FIG. 13 shows the timing chart of signals present in the synthesizing circuit 50.

The reference numeral 51 designates a one-shot multivibrator which generates the load signal $L_0$ at the falling edge of the startup signal START output from the differential speed detecting circuit 30.

The reference numeral 52 designates a down counter which loads a start data START DATA (this is designated by the reference numeral 4 in FIG. 13) generated by the start data setter 4, and then counts down an encoding signal ENL from the start data. The reference numeral 53 designates a flip-flop which outputs a signal SO going "HIGH" at the falling edge of the startup signal START and going "LOW" at the rising edge of the borrow signal $B_0$ output from the down counter 52. The reference numeral 54 designates a gate which outputs a pulse signal $CK_2$ by applying a current limit signal LIMIT amplified by an amplifier 70 shown in FIG. 3 and the signal containing frequency $f_2$ delivered from the divider 2. The reference numeral 55 designates a flip-flop which generates a signal LS going "HIGH" at the falling edge of the signal containing frequency $f_2$ and going "LOW" at the rising edge of the pulse signal $CK_2$.

The reference numeral 56 designates a logical operation circuit which logically processes those incoming signals in order of the priority sequentially given to the START, LS, SO, and the pulse-width modulation signal PWM. After logically processing these input signals in order of the priority, the logical operation circuit 56 eventually outputs a motor-speed control signal SR.

Next, functional operation of the bidirectional driver 60 is described below. The bidirectional driver 60 is substantially a gate-array circuit which outputs drive signals to the transistors $TR_1$ through $TR_4$ which respectively control the rotation of the DC motor 100 by operating themselves based on the logic table shown below on receipt of the motor-speed control signal SR delivered from the synthesizing circuit 50 and the motor forward/backward rotating signal F/R from the controller unit of the copying apparatus. FIG. 14 designates the timing chart of signals output from the bidirectional driver 60.

| Input | | Output | | | |
|---|---|---|---|---|---|
| F/R | SR | $TR_1$ | $TR_2$ | $TR_3$ | $TR_4$ |
| "H" | *¹H | L | H | H | *³L |
| "H" | L | L | H | H | H |
| "L" | *²H | H | L | *⁴L | H |
| "L" | L | H | L | H | H |

Note:
*³designates the signal inverted from the signal *¹.
*⁴designates the signal inverted from the signal *².

Next, referring to FIG. 15, functional operation of the motor speed control device embodied by the invention featuring the above circuit structure is described below.

After completing those preparatory processes to input specific copying conditions like the size of copying paper total rounds of needed copying operations, and magnification, when the operator depresses the copy-start switch at time "$t_1$", the optical system is activated to scan the manuscript for exposure to light. simultaneously, the motor speed control device embodied by the invention controls the speed of the rotation of the motor which drives the optical system by executing those sequential processes shown below.

While the time "$t_1$" is present, the controller unit of the copying apparatus outputs a clock signal CLOCK containing a frequency fc which is determined by the input magnification and also by the reciprocal movement of the optical system. Next, acting on the motor forward ("HIGH") or backward ("LOW") rotating signal F/R and simultaneous with the activation of the copy-start switch, the motor rotating ("HIGH") or stopping ("LOW") instruction signal CONT is output. Then, based on these output signals and the signal $f_2$ delivered from the divider 2, the bias-data generating circuit 10 generates reference clock signals containing frequencies fs and fp in accordance with the frequency table shown below, and in addition, the bias-data generating circuit 10 also generates the load signal LOAD and the bias data BD.

Basically, irrespective of the speed of the rotation of the motor, it is essential for the embodiment of the invention to provide the pulse-width modulation signal PWM for controlling the speed of the rotation of the motor with a specific frequency proportional to the ratio of the variation of the speed of the rotation.

On the other hand, the frequency fc of the clock signal CLOCK varies in accordance with the entered speed of the rotation. Varied speed of the rotation of the motor is detected by variation of the value counted by the up-counter 13. Thus, in order to materialize variation of the counted value to be comparable to the variation of the motor rotation speed under the identical ratio irrespective of the varied frequency fc, the motor speed control device of the invention varies frequencies fs and fp of the reference clock signal by applying the entered motor speed, in other words, by applying the frequency fc of the clock signal CLOCK. As is understood from the frequency table shown below, the motor speed control device embodied by the invention experimentally divides the frequency fc of the clock signal CLOCK into seven steps and provides each step with frequencies fs and fp of the reference clock signal.

| fc (Hz) | fs (Hz) | fp (Hz) |
|---|---|---|
| 5100 > fc ≧ 3000 | 6.7M | 1.5M |
| 3000 > fc > 2000 | 6.7M | 1.0M |

-continued

| fc (Hz) | | fs (Hz) | fp (Hz) |
| --- | --- | --- | --- |
| 2000 ≥ fc ≥ | 950 | 3.3M | 770K |
| 950 > fc ≥ | 780 | 1.0M | 500K |
| 780 > fc > | 620 | 1.0M | 300K |
| 620 ≥ fc ≥ | 460 | 500K | 200K |
| 460 ≥ fc > | 280 | 400K | 80K |

As a result of the introduction of these reference clock signals shown above, even when the motor speed, in other words, even when the frequency of the clock signal CLOCK varies, as shown in FIG. 16 with solid line B, the amount of the speed control against varied speed does not significantly vary, and thus, the control system can execute speed control corresponding to the proportional variation of the speed of the rotation of the motor.

On the other hand, the differential speed detecting circuit 30 generates the startup signal START based on the load signal LOAD delivered from the bias-data generating circuit 10 and the clock signal CLOCK, and then transmits the startup signal START to the synthesizing circuit 50. The differential speed detecting circuit 30 then calculates one-cycle of the clock signal CLOCK by applying the reference clock signal fs, and then latches this data by applying the latch circuit 33. As shown in FIG. 15, when the synthesizing circuit 50 continuously outputs the "HIGH" speed control signal SR at the falling edge of the startup signal START, the bidirectional driver 60 feeds the maximum current to the transistors TR$_1$ through TR$_4$ based on the speed control signal SR and the "HIGH" forward/backward rotating signal F/R, where "HIGH" level designates the clockwise rotation. This activates the DC motor 100 to rotate in the clockwise direction, thus causing the rotary encoder to output the encoding signal EN. The width and the interval of the pulses of the encoding signal EN is gradually contracted relative to the accelerated rotation of the motor. On receipt of the encoding signal EN, the synthesizing circuit 50 counts down the number of pulses of the encoding signal EN by the number of the start data START DATA (4 data according to this embodiment) loaded in the down counter 52. When the number of the pulse is counted down to zero, the synthesizing circuit 50 turns the signal S$_0$ to "LOW" by applying the borrow signal B$_0$, and then switches the state of controlling the flow of the maximum current over to the phase-locked-loop control condition.

The time needed for stabilizing the rotation of the DC motor 100 from the moment of compulsory activation is dependent on the characteristic and the load of the motor itself. When designing the total system, the needed time can be secured by determining the start data by taking the characteristic and the load of the motor into account.

The table shown below designates the time needed for stabilizing the rotation of the activated DC motor 100 against the start data when there is 500 Hz of the frequency fc of the clock signal CLOCK. FIG. 17 shows this. The reference character A in the following table designates 0.4 A and B 1.0 A.

| Start data | A (0.4 A) (mm sec.) | B (1.0 A) (mm sec.) | Counted value of the encoder pulse |
| --- | --- | --- | --- |
| 1 | 0.161 | 0.072 | 1 |
| 2 | 0.251 | 0.078 | 2 |
| 3 | 0.308 | 0.101 | 3 |
| 4 | 0.443 | 0.123 | 4 |
| 5 | 0.627 | 0.18 | 5 |
| 6 | 0.869 | 0.251 | 6 |
| 7 | 1.25 | 0.321 | 7 |

On the other hand, on receipt of the encoding signal EN, the phase comparator 21 of the differential phase detecting circuit 20 compares the phases between the input encoding signal EN and the clock signal CLOCK, and then causes the up-and-down counter 22 to count the reference clock signal fp for a specific period of time in which the differential phase signal G remains "LOW" and then count up or count down the bias data BD delivered from the bias-data generating circuit 10. The value counted by the up-and-down counter 22 is latched by the latch circuit 23 which outputs the latch signal LC at the rising edge of the encoding signal EN, and then the latched value turns into the differential phase data PD.

On the other hand, the up-counter 32 of the differential speed detecting circuit 30 computes the cycle of the encoding signal EN by applying the reference clock signal fs, and then this data is latched by the latch circuit 34. The differential speed detecting circuit 30 then executes subtraction between this data and the other data stored in the latch circuit 33 designating one-cycle of the clock signal CLOCK, thus generating the differential speed data VD before outputting it.

Next, referring to FIG. 9, further detail of the functional operation of the differential speed detecting circuit is described below.

When the load signal LOAD goes "HIGH", the clock signal CLOCK rises. Simultaneously, the latch signal LCB goes "LOW", and at the same time, the clearing signal also goes "LOW". As a result, the latch circuit 34 does not latch the clock signal CK (which is substantially the reference signal fs), but the up-counter 32 starts to count the clock pulse CK. Although the counted value is delivered to the latch circuits 33 and 34, neither of these latch the input counted data. Then, the latch signal LCB goes "HIGH" at the rising edge of the clock signal CLOCK to cause the latch circuit 34 to latch the value counted by the up-counter 32. Immediately after the latch circuit 34 latches this counted value, the clearing signal goes "HIGH" to clear the up-counter 32.

A certain while later, the encoding signal EN enters into the timing circuit 31. This causes the load signal L$_0$ to go "LOW" and then it instantaneously rises to allow the up-counter 32 to read a data (which is a minus value) inverted by the inverter 35 and count the clock signal CK. Concretely, if the inverter 35 outputs a value −8 for example, the up-counter 32 counts up the clock signal CK in order of −7, −6, −5, ... −1. When the latch signal Lca (see the second latch signal LCA in FIG. 7) falls itself from "HIGH" to "LOW", the latch circuit 33 latches the value counted by the up-counter 32 to make up the differential speed data VD.

Figure 1:
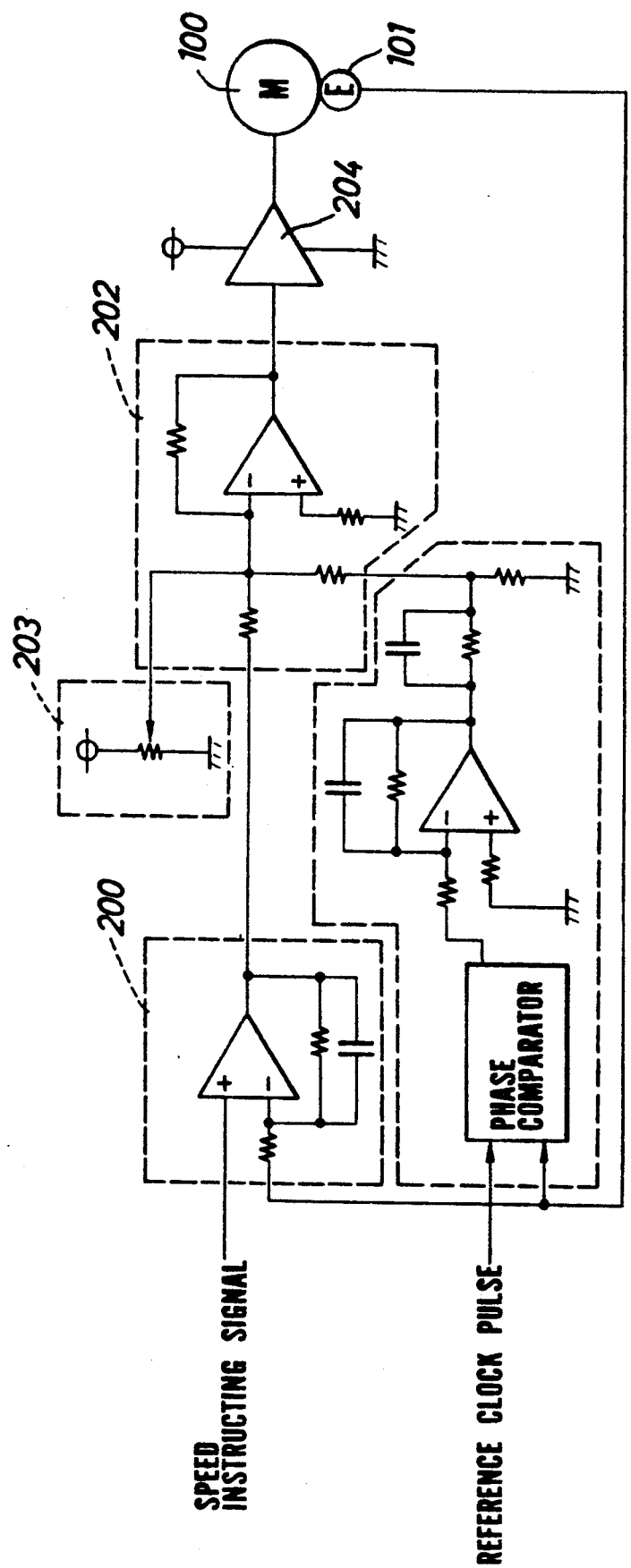
Figure 2:
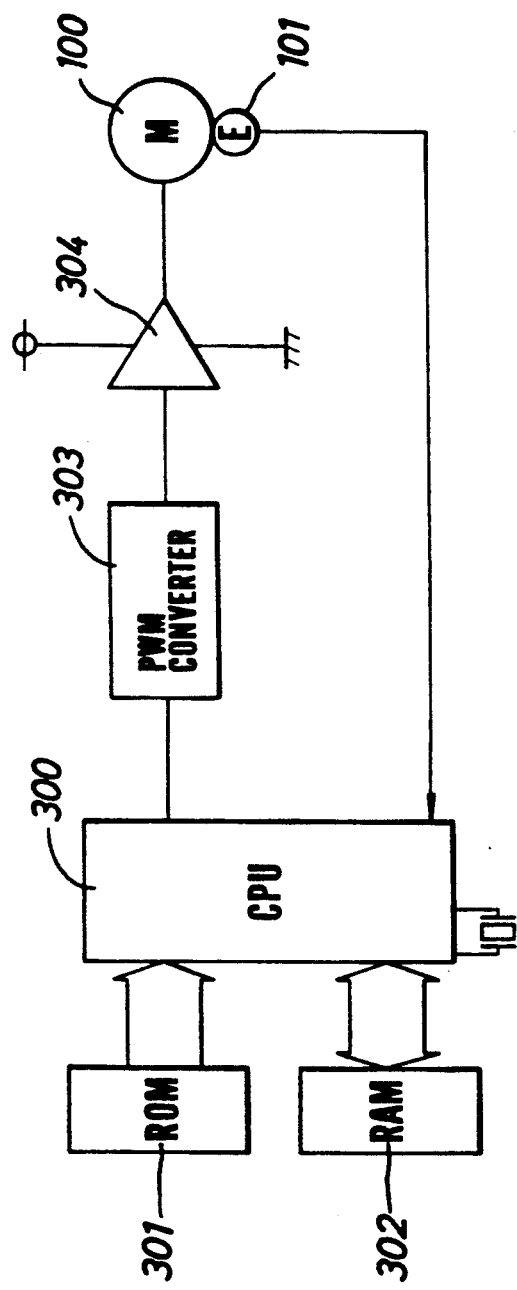

When controlling the rotation of the motor of the copying apparatus incorporating the differential speed detecting circuit having the structure shown in FIG. 8, the rotation of the motor is properly controlled at a constant speed for a certain period of time, and thus, it is effective for the system to provide a differential speed data of the rotation at the initial control period. Based on this idea, the motor speed control device of the invention causes the up-counter 32 to perform the counting and arithmetic operations by delaying time. As a result, compared to the conventional circuit structure shown in FIG. 2, the motor speed control device embodied by the invention can save the number of counters, thus achieving the simplified circuit structure. Furthermore, since the up-counter 32 solely counts the clock signal CLOCK and the encoding signal EN, the motor speed control device of the invention dispenses with subtracter. This provides further simplified circuit structure. Since the motor speed control device latches a one-cycle data of the clock signal CLOCK and uses the clock-counted value during the initial control period, no error can be generated in the clock-counted value. In consequence, the speed of the rotation of the DC motor 100 can stably be controlled without fluctuation of the differential speed data by applying the maximum 2-bit data.

The adder 41 of the modulation circuit 40 adds up the differential phase data PD delivered from the differential phase detecting circuit 20 and the differential speed data VD from the differential speed detecting circuit 30. The addup data is latched by the latch circuit 42.

Based on those rules (1) through (4) shown below, the logical operation circuit 46 outputs specific data signals by applying the carrier signals $CY_1$, $CY_2$, and $CY_3$, and the advance/delay signal U/D, like the one shown below.

(1) Based on the differential phase $\theta$ between the clock signal CLOCK and the encoding signal EN, the differential phase carrier signal $CY_1$ determines the rule shown below.

| | |
|---|---|
| When $\theta \geq 360°$ | "HIGH" |
| When $360° > \theta > 0°$ | "LOW" |
| When $0° > \theta > -360°$ | "LOW" |
| When $-360° \geq \theta$ | "HIGH" |

(2) The operation carrier signal $CY_2$ determines the rule shown below.

| Differential speed data | Result of calculation | Level of carrier signal |
|---|---|---|
| Positive | Abnormal | "LOW" |
| Positive | Normal | "HIGH" |
| Negative | Normal | "LOW" |
| Negative | Abnormal | "HIGH" |

(3) The differential carrier signal $CY_3$ determines the rule shown below by applying frequency $f_E$ of the encoding signal EN.

| | |
|---|---|
| When $f_E > fc$ | "HIGH" |
| When $f_E < fc$ | "LOW" |

(4) The advance delay signal U/D determines the rule shown below when the differential phase between the clock signal CLOCK and the encoding signal EN is expressed by $\theta$.

| | |
|---|---|
| $\theta > 0°$ when advance mode is ON | "HIGH" |
| $\theta < 0°$ when delay mode is ON | "LOW" |

The whole content of the logic table applied by the logical operation circuit 46 is shown below.

| Speed $f_E$, fc | Dif. phase $\theta$ | $CY_3$ | $CY_2$ | U/D | $CY_1$ | Output |
|---|---|---|---|---|---|---|
| $f_E \geq fc$ | $\theta \geq 360°$ | H | H | H | H | L |
| | | H | L | H | H | L |
| | $360° > \theta > 0°$ | H | H | H | L | L |
| | | H | L | H | L | PWM |
| | $0° > \theta > -360°$ | H | H | L | L | PWM |
| | | H | L | L | L | PWM |
| | $360° \geq \theta$ | H | H | L | H | H |
| | | H | L | L | H | H |
| $f_E < fc$ | $\theta \geq 360°$ | L | H | H | H | H |
| | | L | L | H | H | L |
| | $360° > \theta > 0°$ | L | H | H | H | PWM |
| | | L | L | H | L | PWM |
| | $0° > \theta > -360°$ | L | H | L | L | PWM |
| | | L | L | L | L | H |
| | $360° \geq \theta$ | L | H | L | H | H |
| | | L | L | L | H | H |

The term PWM shown above indicates that PWM' (which is substantially the signal Q delivered from the flip-flop 45) is output.

On receipt of the pulse width modulation signal rom the modulation circuit 40, the synthesizing circuit 50 outputs the motor speed control signal SR shown in FIG. 15. The ratio of the ON-OFF period of the motor speed control signal SR is variable in accordance with the encoding signal EN. Based on the logic table shown above, the bidirectional driver 60 varies the time of the power supply to the transistors $TR_1$ through $TR_4$ so that the current flowing into the DC motor 100 can properly be controlled. The motor speed control device of the invention thus properly controls the speed of the rotation of the DC motor 100 as shown in FIG. 15.

Under proper control of the speed of the rotation, the DC motor 100 rotates clockwise to drive the optical system of the copying apparatus so that the light-exposing lamp can scan the objective manuscript. When the optical system moves forward by a specific distance corresponding to the size of the manuscript, the motor rotating/stopping instruction signal CONT goes "LOW" to stop the rotation of the motor.

Immediately after the signal CONT has turned to "LOW", the controller unit of the copying apparatus outputs the "LOW" forward/backward rotating signal F/R and the "HIGH" motor rotating/stopping instruction signal CONT. Then, the time "$t_1$" is restored so that the return movement of the optical system can be activated. Nevertheless, the clock signal CLOCK contains frequency fc higher than that is present during the forward movement of the optical system. This is because the motor speed control device drives the optical system backward at a speed faster than that is applied to the forward movement. Since the speed control process for the return movement of the optical system is exactly identical to that is applied to the forward movement, description of this is deleted.

In the event that any abnormal condition arises due to flow of excessive current into the DC motor 100 while the optical system moves forward or backward (like the one that obliges the optical system to stop the movement due to generation of excessive load for example), the amplifier 70 delivers a current limit signal LIMIT to the synthesizing circuit 50. This activates the gate 54 and the flip-flop 55 of the synthesizing circuit 50 to prevent the logical operation circuit 56 from externally delivering a sufficient amount of the speed control signal SR, and as a result, the DC motor 100 does not rotate itself at all.

The description of the above embodiment has solely referred to the DC motor 100 which drives the optical system of the copying apparatus for example. However, the motor speed control device embodied by the invention is also effectively applicable to those DC motors built in the copying apparatus including the one available for driving the photoreceiving drum, transfer drum, stationary rollers, paper-feeding system, paper-conveying system, paper-discharging system, or the developing sleeve of the magnetic-brush applied developer, a polygonal unit of the laser printer, automatic manuscript feeder, or the copying-paper conveying system for use with a sorter, or for driving the belt connected to the photoreceiving drum, or the like, as well.

When applying the motor speed control device of the invention to those motors for driving the apparatus components other than the optical system, speed values applicable to those motors are not identical to each other according to the load applied to these components to be driven, and yet, the values of frequency fc of the clock signal delivered from the controller unit of the copying apparatus are also not identical to each other.

Furthermore, it is essential for the speed control device to finely adjust bias data for each motor by applying the bias adjuster 3.

In the above embodiment, the start data START DATA is manually determined by applying the start data setter 4. However, the start data may freely be input from the controller unit of the copying apparatus. The start data may also be varied on the way of the forward or backward movement of the optical system. This in turn offers optimal motor-activating characteristic for the forward and backward movements of the optical system.

The above embodiment switches frequencies fs and fp of the clock signal into 7 different steps according to the state of the clock frequency fc. It is also possible for the motor speed control device of the invention to more delicately control the speed of the rotation of the motor by dividing frequency into more number of the reference clock signal.

As is clear from the above description, according to the invention, since the motor speed control device is totally composed of digital circuits on the IC basis featuring easy assembly and inexpensive cost, the speed control device can precisely control the speed of the rotation of the built-in motors by applying the fully digitalized PLL method covering an extensive range without incurring external interference, and yet, without provision of the CPU at all. Furthermore, even when the motor rotating speed extensively varies, the speed control device of the invention can always precisely control the speed of the rotation by applying a constant control amount against proportional variation of the speed of the motor.

By virtue of the simplicity of the circuit structure, the motor speed control device embodied by the invention is totally free from counting error otherwise caused by external interference like noise, thus achieving extremely precise control of the speed of the rotation of the motor.

Furthermore, according to the motor speed control device of the invention, a fail-proof PLL format speed control can securely be achieved from the moment immediately after activating the rotation of the motor.

What we claimed is:

1. A motor speed control device for use in an image forming apparatus comprising;
    a bias-data generating circuit for generating a bias data on a clock signal having a given frequency corresponding to a predetermined speed of a motor;
    a differential phase detecting circuit for outputting a differential phase data by biasing a first counted value with said bias data, wherein said first counted value is the result of counting the differential phase between said clock signal and a motor-rotating pulse signal having a frequency proportional to an actual speed of said motor, and wherein said first counted value is counted in terms of a first reference clock pulse having a higher frequency than that of said clock signal;
    a differential speed detecting circuit for outputting a differential speed data by digitally operating a second and a third counted values, wherein said second and third counted values are respectively the result of counting the length of one-cycle of said clock signal and the length of one-cycle of said motor-rotating pulse signal in terms of a second reference clock pulse having a higher frequency than that of said clock signal; and
    a modulation circuit for digitally operating said differential phase data and said differential speed data and outputting a pulse width modulation signal obtained by counting the result of operation, whereby to control the speed of said motor.

2. The motor speed control device according to claim 1, further comprising an automatic frequency switching means for automatically switching frequencies of said first and second reference clock pulses in accordance with the frequency of said clock signal.

3. The motor speed control device according to claim 1, wherein said differential speed detecting circuit latches the result of counting said second reference clock pulse during one-cycle of said clock signal after entry of a motor-rotating instruction signal and provides said result as second counted value during rotation of said motor.

4. The motor speed control device according to claim 1, wherein said differential speed detecting circuit includes means for compulsorily activating said motor on receipt of said motor-rotating instruction signal and releasing said motor from the state of compulsory activation upon counting predetermined number of motor-rotating pulse signal.

* * * * *